Oct. 12, 1971    C. E. BENTZ    3,611,804
FLUIDIC TEMPERATURE SENSOR WITH U-SHAPED RESONANT CAVITY
Filed April 30, 1970    3 Sheets-Sheet 1
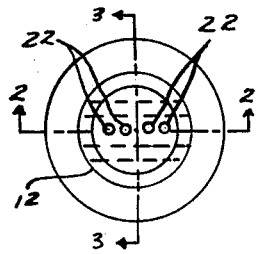
Fig-1
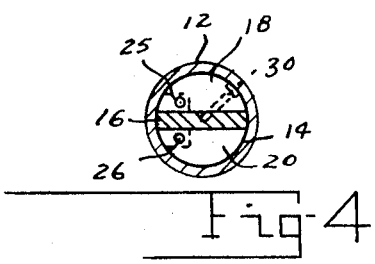
Fig-4
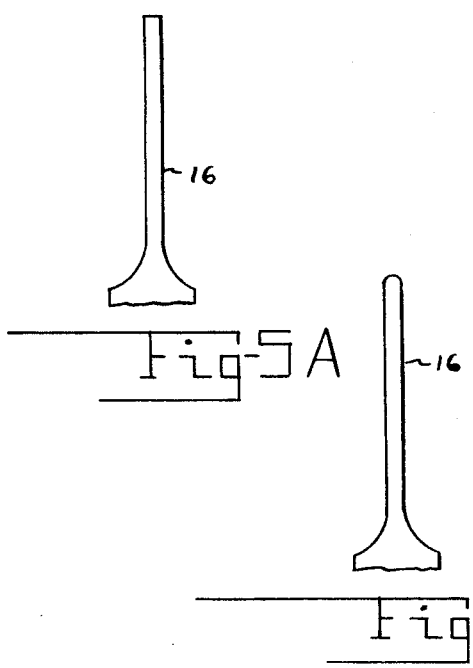
Fig-5A
Fig-5B
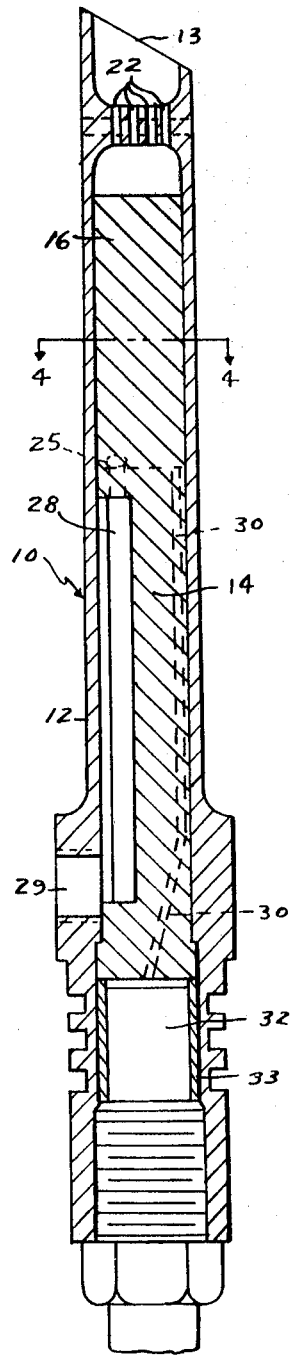
Fig-2
INVENTOR.
CHARLES E. BENTZ
BY Harry A. Herbert Jr
ATTORNEY
Richard J. Killoren
AGENT

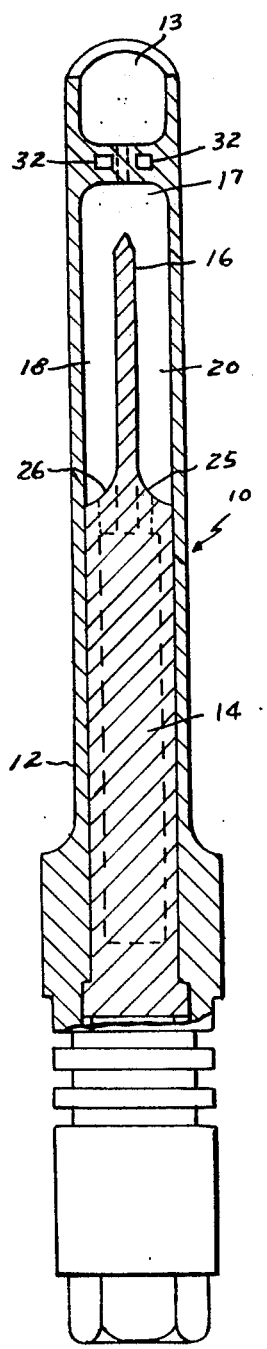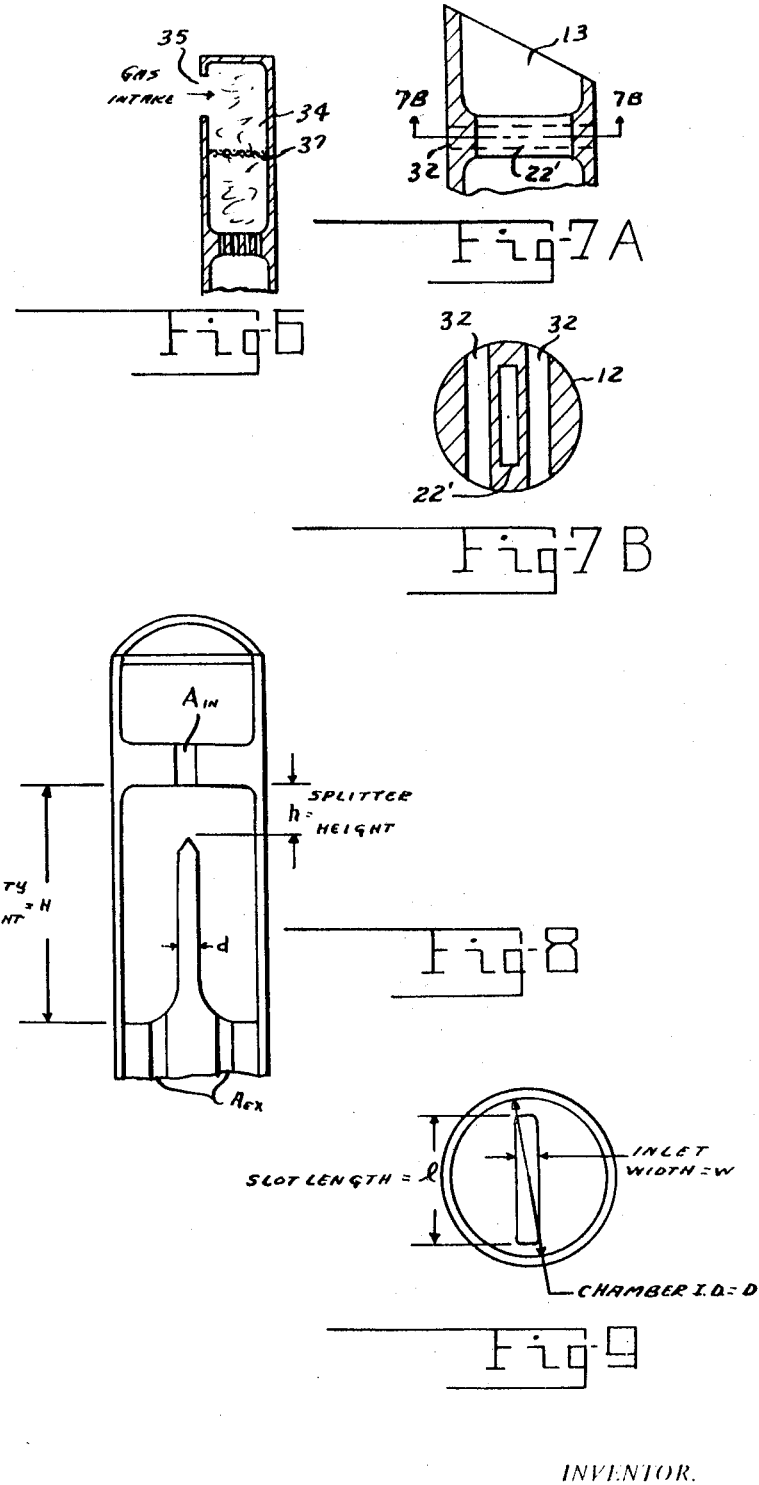

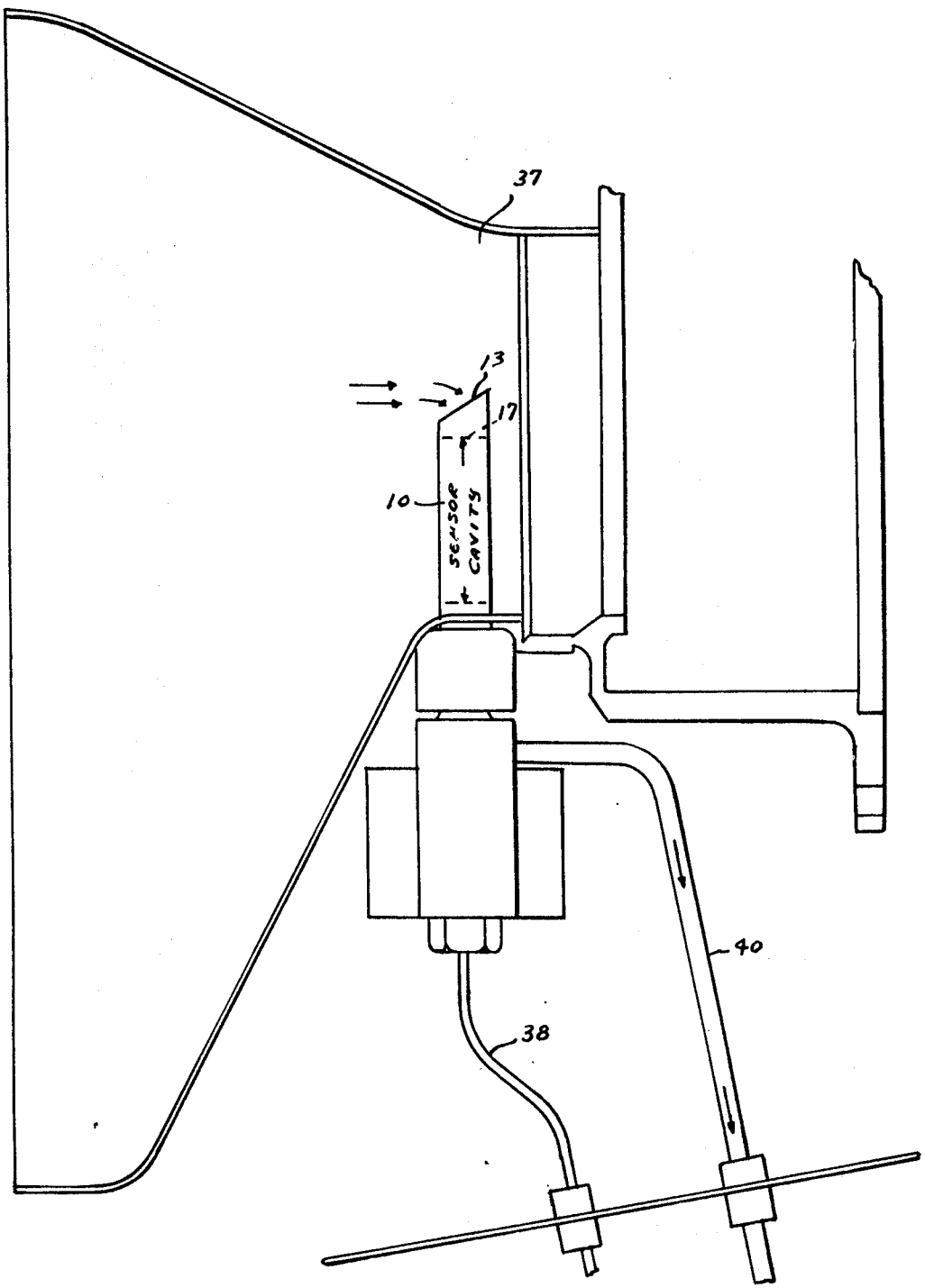

United States Patent Office 3,611,804
Patented Oct. 12, 1971

3,611,804
FLUIDIC TEMPERATURE SENSOR WITH U-SHAPED RESONANT CAVITY
Charles E. Bentz, Dayton, Ohio, assignor to the United States of America as represented by the Secretary of the Air Force
Filed Apr. 30, 1970, Ser. No. 33,445
Int. Cl. G01k 11/26
U.S. Cl. 73—349
9 Claims

ABSTRACT OF THE DISCLOSURE

A fluidic temperature sensor having a target vane positioned opposite an inlet orifice in a tubular housing wherein the target vane divides the cavity to form a substantially U-shaped resonant cavity wherein the frequency is a function of the temperature of the test gas entering the sensor cavity. The pressure signal is converted to an electrical signal by a piezoelectric transducer. In operation the small sensor is located directly in the gas flow of a turbine inlet.

BACKGROUND OF THE INVENTION

Direct measurement of turbine inlet temperature is desirable to increase turbine life and to provide better cycle control. Hot gas temperature above 2000° F. in modern turbine engines makes it impossible to measure the temperature with thermocouples due to their limited life and performance deterioration at high gas temperatures. Prior art fluidic temperature sensors have to be mounted external to the flow because of material limitations and because their large size causes excessive flow blockage. Attempts to miniaturize the prior art sensor resulted in excessively high output frequencies.

External mounting of the temperature sensor contributes to poor steady state accuracy and the large size of the sensors contributes to slow transient response which qualities are undesirable for turbine inlet temperature measurements.

BRIEF SUMMARY OF THE INVENTION

According to this invention a sensor configuration is provided wherein a pneumatic oscillator has a target vane positioned within a tubular cavity and provides a substantially U-shaped oscillator cavity extending along the sides of the target vane. The sensor, because of its small size, can be placed directly in the turbine inlet flow and collects turbine inlet gas which is directed toward the target vane and produces an output frequency which can be directly related to temperature. Since the sensor is small and can be placed directly in the turbine inlet flow, faster transient response and more accurate steady state temperature indications are possible.

IN THE DRAWING

FIG. 1 is an end view of a fluidic temperature sensor according to the invention;
FIG. 2 is a partially schematic sectional view of the device of FIG. 1 along the line 2—2;
FIG. 3 is a partially cutaway view of the device of FIG. 1 along the line 3—3;
FIG. 4 is a sectional view of the device of FIG. 1 taken along the line 4—4 of FIG. 2;
FIG. 5A shows a modified target vane for the device of FIG. 1;
FIG. 5B shows another modification for the target vane of the device of FIG. 1;
FIG. 6 shows a modified test gas inlet configuration for the device of FIG. 1;
FIG. 7A is a cutaway sectional view of a modified inlet orifice for the device of FIG. 1;
FIG. 7B is a sectional view of the apparatus of FIG. 7A along the line 7B—7B;
FIG. 8 is a schematic illustration showing various dimensions for the device of FIG. 1;
FIG. 9 shows additional dimension for the device of FIG. 1; and
FIG. 10 is a schematic illustration showing the position of the sensor in a turbine inlet in normal use.

Reference is now made to the drawing wherein a temperature sensor 10 shown in FIGS. 1-4 has a tubular body member 12 with a gas inlet 13. A stem element 14 with a vane target member 16 is positioned within the body member 12. The vane 16 divides the chamber 17 in body member 12 into two portions 18 and 20 of a substantially U-shaped resonant cavity. Test gas is supplied to the chamber 17 through openings 22 which are aligned with the target vane 16. The vane end may have a wedge shape as shown or may have other shapes such as square or rounded as shown in FIGS. 5A and 5B. The width of the openings 22 must be greater than the width of the end of the target 16. With a blunt target, as in FIG. 5A, wider openings 22, than those shown, must be provided. A pair of exit ports 25 and 26 are located in portions 18 and 20 of the resonant cavity. From exit ports 25 and 26 the test gas passes into a channel 28 to outlet 29. A signal passage 30 leads from one portion 18 to a position adjacent transducer 32 which is shown schematically. A spacer member 33 surrounds the transducer 32.

If the transducer is located away from the heat with a fluidic channel provided between signal passage 30 and the transducer, any type of signal transducer may be used to provide an electrical output signal. When the transducer is placed in close proximity to the heat source, as shown, a high temperature pressure transducer, such as a Kistler Model 702 M111 piezoelectric transducer, must be used.

Passages 32 may be provided adjacent passage 22 to permit the flow of test gas therethrough to reduce the sensor transient response time constant.

While the device thus far described may be used with Mach numbers less than .1, a flow settling region, as shown in FIG. 6, may be required when the Mach number exceeds .1. A chamber 34 is formed adjacent inlet passages 22 with a gas intake 35. A screen or other type of flow straightener 37 may be provided in chamber 34.

An elongated slot 22' may be provided in place of circular passages 22, as shown in FIG. 7.

For the preferred embodiment of a temperature sensor for operation between 2000 c.p.s. and 10,000 c.p.s., the configuration should be as shown in FIGS. 8 and 9 with dimensions as follows:

$$.200 \geq h \geq .075 \text{ inch} \tag{1}$$

$$.2 \geq \frac{h}{H} \geq .05 \tag{2}$$

However, cavity resonance can also be achieved with cavity height of $nH$ where $n=1, 2, 3$, etc., with H being as in expression (2).

$$\frac{l}{D} < 1 \tag{3}$$

With a slot inlet as in FIG. 7

$$.45 \leq \frac{A_{ex}}{A_{in}} \leq 1.05 \tag{4}$$

With a four-hole inlet $$.75 \leq \frac{A_{ex}}{A_{in}} \leq 1.05 \tag{5}$$

Also the sensitivity to the pressure of the test gas can be reduced with the size of the outlet openings 25 and 26 being designed for choked flow. However, the device will operate in the unchoked mode. To withstand high temperature the parts should be made of high-temperature stainless steel, alloy steel, nickel base alloys or ceramics.

In the operation of the device as shown in FIG. 10 with sensor chamber 17 located entirely within the hot gas flow stream in turbine inlet 37, as shown, gas enters the inlet 13 and passes through openings 22 to impinge on target 16. Oscillations set up in the cavity are sensed and converted to an electrical signal by transducer 32. The frequency of the signal is given by the following expression.

$$f_{(c.p.s.)} = \frac{\sqrt{\gamma g r t}}{2(L_1 + L_2 + C)}$$

where $L_1 = L_2$ = effective splitter height (FT)
$C$ = effective increase in sonic path length due to a finite switching time
$\gamma$ = ratio of specific heat = $C_p/C_v$ (for sampled gas)
$g$ = gravitational constant
$r$ = gas constant (of sampled gas)
$t$ = measured gas temperature (° R.)

The electrical signal from the transducer 32 is taken off by electrical outlet lead 38. The exhaust gas from outlet 29 passes out through conduit 40.

There is thus provided a high temperature sensor wherein the sensor cavity is positioned in the hot gas flow so that steady state accuracy and transient response performance are significantly improved.

I claim:
1. A fluidic temperature sensor, comprising: a tubular member; means, including a longitudinally positioned vane member, for forming a substantially U-shaped resonant cavity within said tubular member; means for directing a flow of test gas toward the end of said vane member for setting up acoustical oscillations within said cavity and means, for providing an acoustical output signal from said resonant chamber, and means responsive to said output signal for converting acoustical oscillations to an electrical output signal.

2. The device as recited in claim 1 wherein said means for directing a flow of test gas toward the end of said vane includes a wall with a plurality of channels therethrough in line with said vane and means for collecting test gas and for directing the test gas through said channels.

3. The device as recited in claim 2 including a pair of lateral passages for test gas in the wall adjacent said plurality of channels whereby the wall adjacent the plurality of channels is maintained substantially at test gas temperature.

4. The device as recited in claim 2 wherein said means for collecting and for directing the test gas through said channels includes a substantially closed tubular settling chamber adjacent said plurality of channels; a gas inlet orifice in the wall of said tubular chamber.

5. The device as recited in claim 4 wherein said means for converting the acoustical oscillations to an electrical signal is a high temperature piezoelectric transducer positioned adjacent said resonant chamber output means.

6. The device as recited in claim 1 wherein said means for directing a flow of test gas toward the end of said vane includes a wall and an elongated substantially rectangular shaped channel therethrough in line with said vane and means for collecting test gas and for directing the test gas through said channel.

7. The device as recited in claim 6 including a pair of lateral passages in the wall adjacent said elongated rectangular shaped channel whereby the wall adjacent the plurality of channels is maintained substantially at test gas temperature.

8. The device as recited in claim 7 wherein said means for collecting and for directing the test gas through said channels includes a substantially closed tubular settling chamber adjacent said plurality of channels; a gas inlet orifice in the wall of said tubular chamber.

9. The device as recited in claim 8 wherein said means for converting the acoustical oscillations to an electrical signal is a high-temperature piezoelectric transducer positioned adjacent said resonant chamber output means.

References Cited

UNITED STATES PATENTS

| 2,582,232 | 1/1952 | Cesaro | 73—339 |
| 3,169,507 | 2/1965 | Rich | 116—137 |
| 3,470,743 | 10/1969 | Steinberg | 73—339 |

FOREIGN PATENTS

| 1,512,875 | 1/1968 | France | 73—339 |

LOUIS R. PRINCE, Primary Examiner

D. E. CORR, Assistant Examiner

U.S. Cl. X.R.

73—339 A